Oct. 11, 1938.　　　D. D. ORMSBY　　　2,133,112
DIFFERENTIAL
Filed Sept. 18, 1936
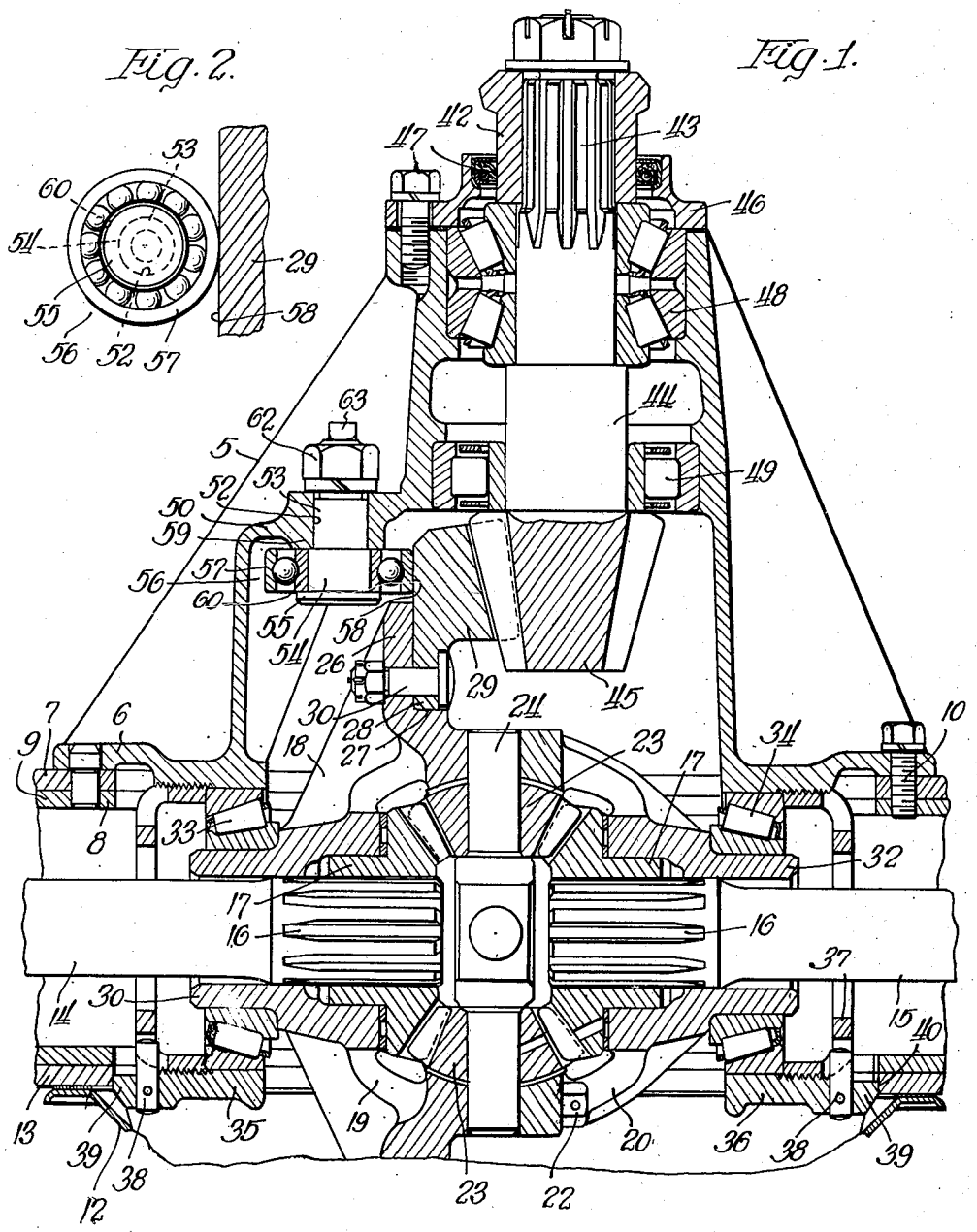
Inventor:
Donald D. Ormsby.
By
Brown, Jackson, Boettcher & Dienner
Attys Patented Oct. 11, 1938

2,133,112

UNITED STATES PATENT OFFICE 2,133,112

DIFFERENTIAL

Donald D. Ormsby, Niles, Mich., assignor to Clark Equipment Company, Buchanan, Mich., a corporation of Michigan Application September 18, 1936, Serial No. 101,421

1 Claim. (Cl. 74—311)

This invention relates to differential assemblies, and more particularly is directed to differential assemblies of the type for use in driving automotive vehicles, such as automobiles, busses and the like.

Broadly stated, the present invention pertains to a differential construction of the type employing a differential carrier bolted or otherwise suitably secured to the annular flange of a banjo type axle housing, which carrier is adapted to provide means for supporting the differential case in suitable bearings, and also carries the pinion gear connected to the conventional change speed transmission for driving a ring gear secured to the differential case.

In the pinion and ring gear type of driving engagement between the drive shaft and the differential case, a considerable amount of lateral thrust is exerted upon the ring gear by the pinion gear under severe torque conditions, which results in distortion of the ring gear and possible misalignment thereof. Many attempts have been made to compensate for this thrust, including adjustable stud members which have direct bearing engagement with the outer face of the ring gear, to prevent displacement of the ring gear under severe torque. However, disadvantages of the prior constructions have indicated some other type of means must be provided for this purpose.

The present invention has for its primary object the provision of a mechanism for compensating for the thrust on the ring gear which includes anti-friction means having rolling movement with the ring gear, whereby no frictional sliding engagement is produced, and consequently no appreciable wear between the parts is produced. This is distinctly advantageous over the type of stud engagement heretofore employed, in which a ring was worn into the face of the ring gear due to the frictional engagement of the end of a stud therewith.

Another feature of the present invention is the provision of a construction which can be readily adjusted to accommodate the same to different conditions, and which can be adjusted to take up wear or the like, the adjustment being conveniently placed so that no portion of the carrier need be disassembled to allow the adjustment to be made.

Still another feature of the present invention is the provision of a simplified construction which can be readily placed in position, and which needs no attention thereafter while yet being of such character as to readily perform its desired function.

Other objects and advantages of the present construction will appear more fully from the following detailed description, which, taken in conjunction with the accompanying drawing, will disclose to those skilled in the art the particular construction and operation of a preferred form of the present invention.

In the drawing:

Figure 1 is a sectional view through a differential carrier assembly showing the present invention in operative position; and Figure 2 is a sectional view, showing in detail the manner in which the back-up means for the ring gear may be adjusted.

Referring now to the drawing in detail, I have indicated a different carrier generally by the reference numeral 5. The carrier is provided with an annular flanged portion 6 adapted to be bolted to the flange ring 7 extending about and secured to the flange 8 defining the banjo opening or central differential housing of the axle housing 9. The manner of securing the differential carrier to the housing is optional, in one preferred form in being secured thereto by bolts as indicated at 10 which are threaded into the ring 7 and the flange 8.

A suitable back cover plate 12, of generally semi-spherical form, is bolted to the opposite flange ring 13 of the axle housing, and encloses the opposite side of the banjo opening formed in the housing.

Extending through the opposite arms of the housing 9 are the axle spindles 14 and 15, which spindles at their inner ends are splined as indicated at 16, to receive the hub portions of the driving gears 17. The gears 17 are mounted within the differential casing indicated generally at 18, this casing comprising the two portions 19 and 20 bolted together by a series of peripheral bolts 22, as is the usual practice. The pinion gears 23, mounted on the cross shafts 24 are adapted to have meshing engagement with the teeth of the gears 17, and the shafts 24 are normally locked in position between the opposite halves of the differential case. The portion 19 of the differential case is provided with the offset flange portion 26, which is provided with the annular shoulder 27 forming a seat for receiving the inner flange portion 28 of the ring gear 29. The gear 29 is secured against the face of the flange 26 by means of a series of circumferentially spaced bolts 30, extending through the flange 28 of the gear 29 and through the flange 26 of the portion 19 of the casing 18. Thus the gear 29 is rigidly secured for conjoint rotation with the differential casing 18, and when driven from the drive shaft, rotates the casing 18 to produce corresponding driving engagement of the gears 17 for driving the axle spindles 14 and 15 through the splined portions 16 engaging the hubs of the gears 17.

The differential case is provided with oppositely extending cylindrical portions 30 and 32, journaled for rotation in bearings 33 and 34, respectively, which are mounted in position on the carrier 5 by means of the bearing brackets 35 and 36, respectively, and which are adapted to receive the bearing retaining spiders 37 for adjusting the bearings 33 and 34. The spiders 37 are locked in adjusted position by means of the lock pins 38 extending through the brackets 35 and 36 and through suitable cutout or notched portions of the spiders 37. The brackets 35 and 36 are held against lateral cocking by the engagement of boss portions 39 formed thereon against the inner annular face 40 of the ring 13, whereby the torque transmitted to the bearings from the ring gear due to severe driving conditions will not cause the brackets 35 and 36 to spread outwardly laterally, and thus will maintain the bearings 33 and 34 in proper position. By reason of the fact that the opening in the axle housing can be accurately machined, and held within relatively close limits, and also by reason of the fact that the portions 39 of the bearing brackets 35 and 36 can also be accurately machined, relatively close fitting engagement between these stud portions 39 and the ring 13 can be provided, so as to hold the bearings in proper fixed position against displacement.

A portion of a universal coupling member is indicated at 42, and engages the splined end 43 of the drive pinion shaft 44, which at its opposite end is provided with the pinion gear 45 having driving engagement with the teeth of the ring gear 29. A closure cap member 46 is provided over the end of the differential carrier, for sealing the interior of the carrier, and sealing means 47 of conventional type are employed about the external surface of the universal coupling member 42, which is adapted to have connection to the propeller shaft leading to the conventional change speed transmission. Suitable bearing means, indicated generally at 48, is provided for journaling the outer end of the shaft 44 in the outer end of the carrier 5, and adjacent the inner end of the shaft 44 roller bearings 49 are provided, to suitably support the inner end of the gear portion 45 of the shaft.

The differential carrier 5 is provided with an offset boss portion 50, which is provided with an axially extending opening 52 adapted to receive the stud 53 of a suitable backup means to be described in detail hereinafter.

The stud 53 is provided with an off-center enlarged portion 54 terminating in an outwardly flanged head 55. A suitable ball bearing assembly 56 is mounted about the eccentric portion 54 of the stud 53, and the outer race 57 of the bearing assembly has engagement with the rear face 58 of the ring gear 29. The inner race 60 of the bearing assembly is locked between the boss portion 59 of the offset 50 and the flanged head 55 of the stud 53. The stud is held in fixed position by means of the nut 62 threaded thereon, the stud itself terminating in a square or polygonally shaped end portion 63 whereby upon loosening of the nut 62 the stud 53 may be turned to rotate the portion 54 toward or away from the face 58 of the ring gear 29.

By reason of the off center position of the portion 54 of the stud with respect to the central portion 53 of the stud, rotation of the stud 53 about its axis will move the portion 54 toward or away from the face 58 of the ring gear, and consequently will move the outer race 57 of the bearing assembly toward or away from this face. By this means, adjustment can be obtained so that the outer race of the bearing assembly 57 will be in engagement with the rear face of the ring gear 29 to back up the same and prevent distortion of the ring gear under severe driving stresses. Due to the fact that the stud 53 has relatively elongated longitudinal support in the reinforced boss portion 59 of the offset 50, no tendency for cocking of the stud is produced, and consequently the bearing assembly can be maintained in position even under the severest of driving conditions wherein a severe torque is imposed on the ring gear.

Thus, by disposing the anti-friction means for rotation in a plane normal to the plane of rotation of the ring gear, and providing for adjustment laterally of said plane toward and away from the plane of the ring gear, I am able to provide a positive backup means for opposing the thrust imposed upon the ring gear, and at the same time provide for rolling engagement therebetween which will produce a minimum of wear between the contacting surfaces while yet supporting the mechanism in such manner that it will accommodate all stresses to which the ring gear may be subjected.

I am aware that various changes may be made in connection with the design of the differential casing, the particular arrangement of the gears and the like, and I do not intend to limit the present invention to the particular differential mechanism which I have disclosed, but only in so far as defined by the scope and spirit of the appended claim.

I claim:

In combination, a differential carrier, a differential assembly rotatably supported by said carrier including a ring gear, a pinion shaft journalled in said carrier for driving said ring gear, a stud projecting through a boss on said carrier having its axis parallel to the axis of said pinion shaft and having a squared end externally of said carrier, said stud having a portion of the shank formed as an eccentric, ball bearing means carried by said portion including an inner race clamped between the head of said stud and said boss and having its outer race engaging the back face of said ring gear, and nut means threading over the projecting portion of said stud beneath said end preventing relative axial movement of said bearing assembly with respect to said boss, said bearing means being adjustable toward and away from said ring gear upon rotation of said stud relative to said nut means.

DONALD D. ORMSBY.